Dec. 30, 1952     G. J. O. WELIN-BERGER     2,623,511
HEATING MEANS FOR INTERNAL-COMBUSTION ENGINES
Filed Oct. 18, 1949     8 Sheets-Sheet 1

INVENTOR:
Guy John Olof Welin-Berger,
BY:
Pierce, Scheffler & Parker,
ATTORNEYS.

Dec. 30, 1952      G. J. O. WELIN-BERGER      2,623,511
HEATING MEANS FOR INTERNAL-COMBUSTION ENGINES
Filed Oct. 18, 1949      8 Sheets-Sheet 2
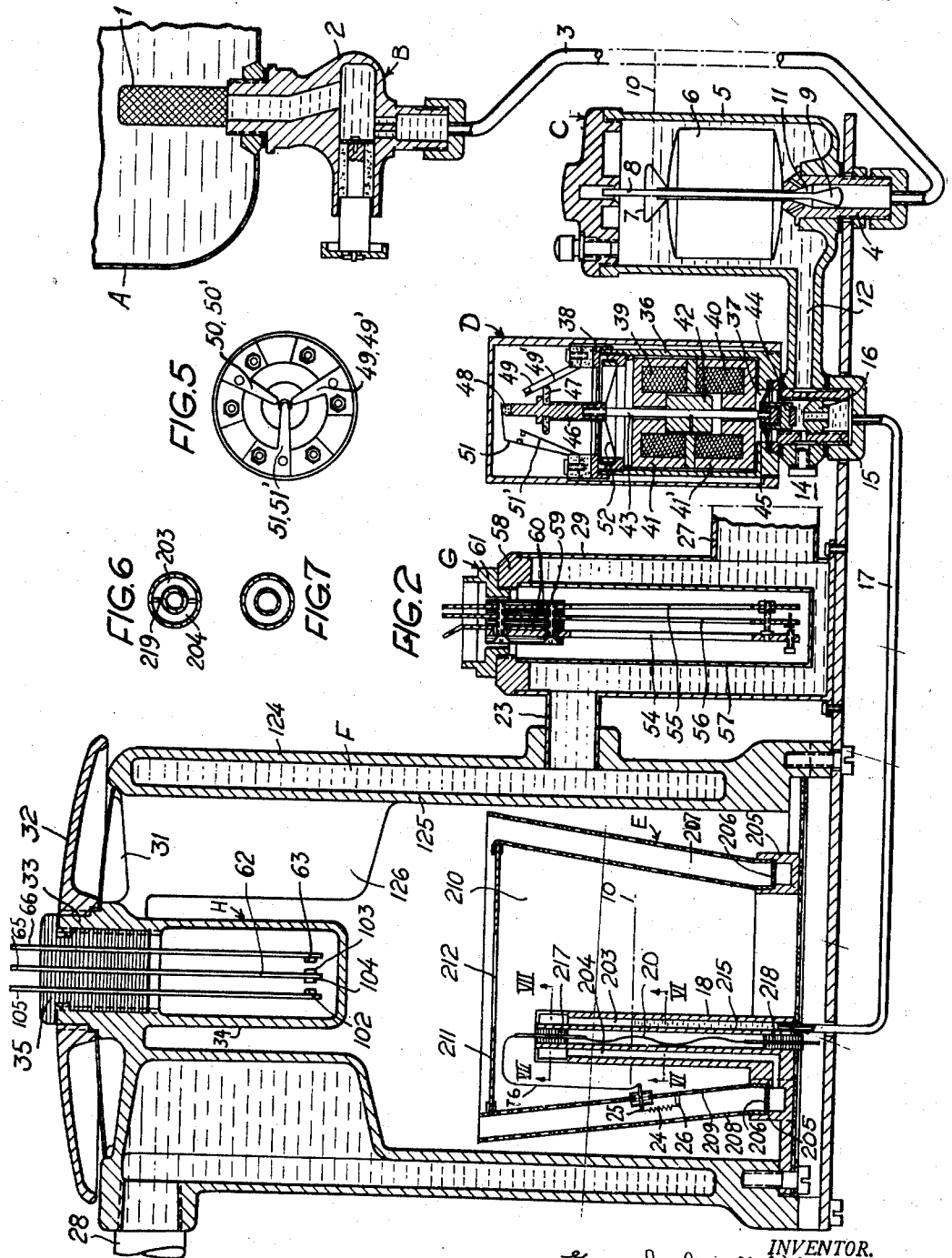

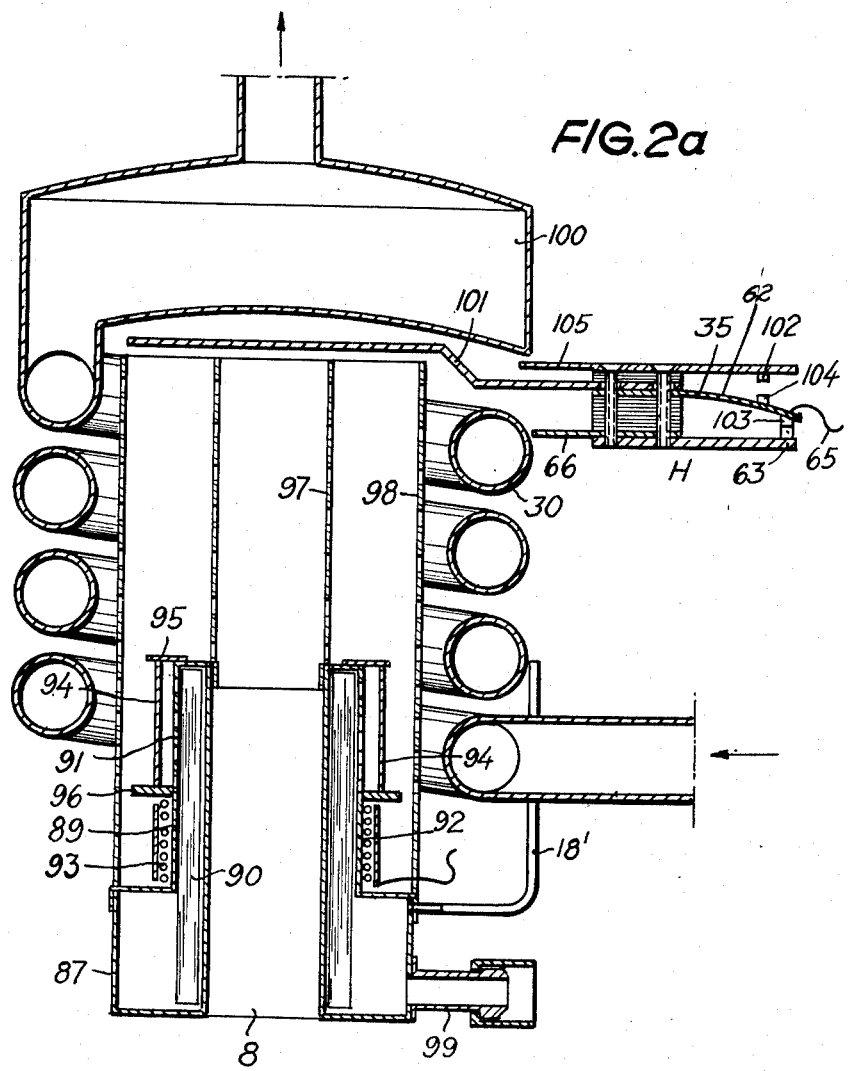

Dec. 30, 1952  G. J. O. WELIN-BERGER  2,623,511
HEATING MEANS FOR INTERNAL-COMBUSTION ENGINES
Filed Oct. 18, 1949  8 Sheets-Sheet 4

INVENTOR:
Guy John Olof Welin-Berger,
BY:
Pierce, Scheffler & Parker,
Attorneys.

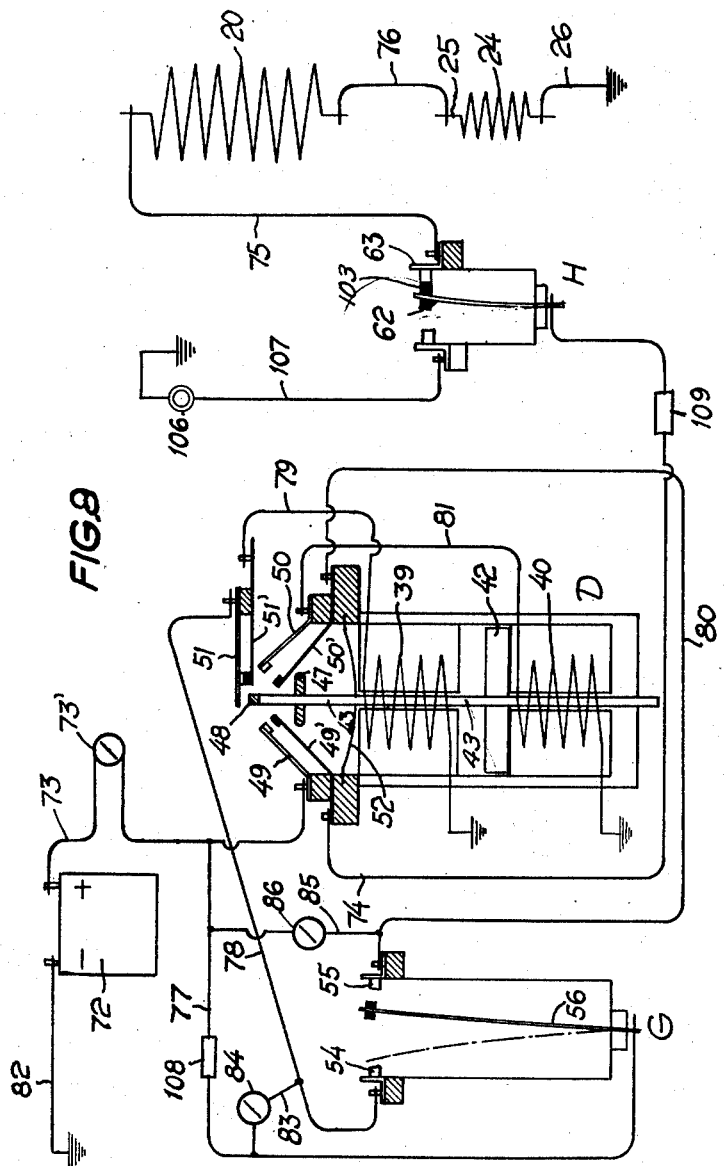

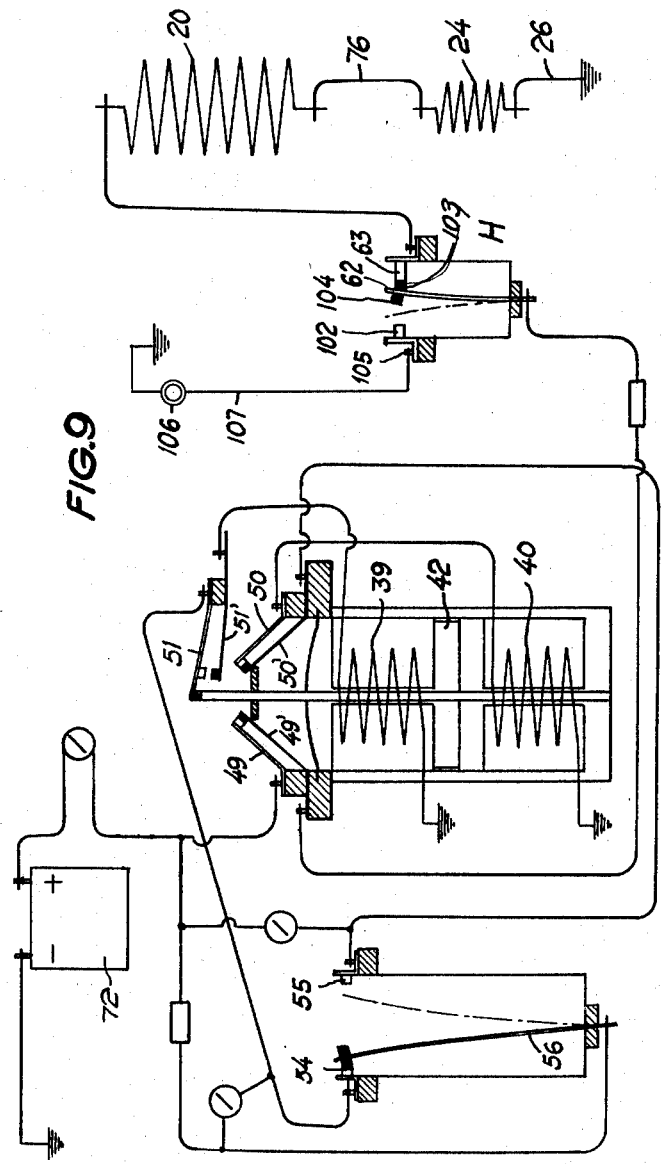

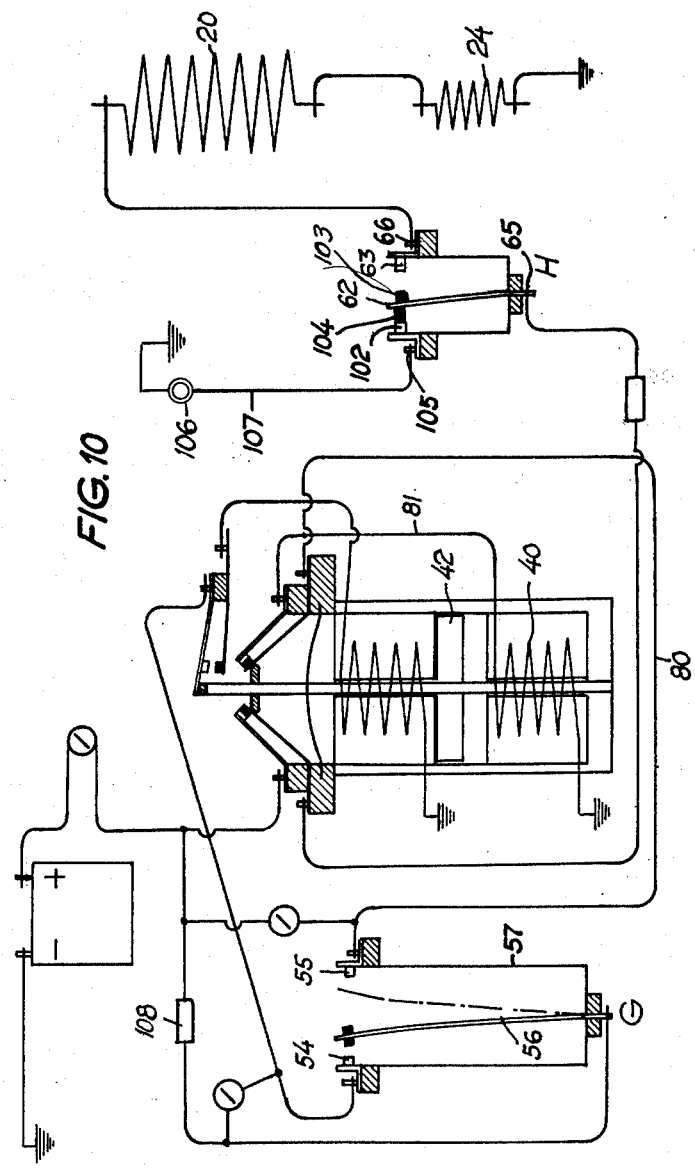

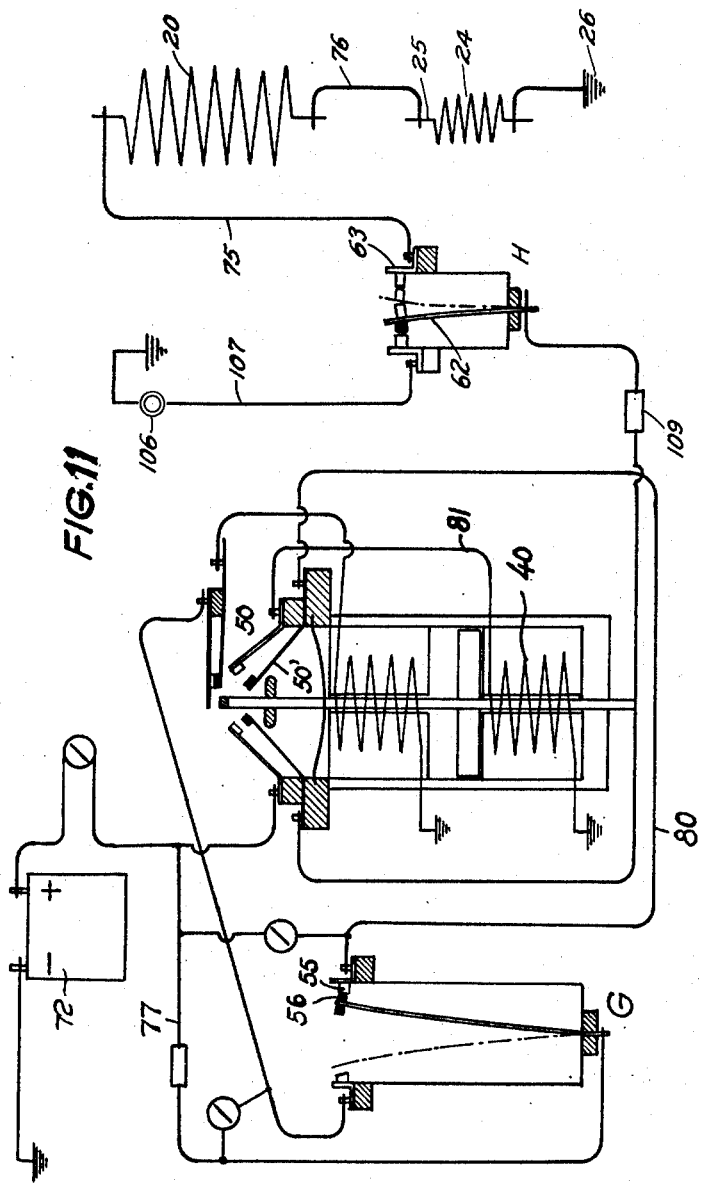

Patented Dec. 30, 1952

2,623,511

UNITED STATES PATENT OFFICE 2,623,511

HEATING MEANS FOR INTERNAL-COMBUSTION ENGINES

Guy John Olof Welin-Berger, Stockholm, Sweden

Application October 18, 1949, Serial No. 121,958
In Sweden October 20, 1948

14 Claims. (Cl. 123—142.5)

The invention relates to improvements in heating means for maintaining the liquid in liquid cooled internal combustion engines at a sufficiently high temperature during extremely cold weather and to prevent the temperature from dropping below a certain value and possibly from freezing.

The primary object of the invention is to provide an improved heating system which may be employed in connection with the cooling system of an internal combustion engine, particularly for motor vehicles, including means for automatically operating the heating system for raising the temperature of the liquid in the cooling system when the atmospheric temperature is low enough to chill the liquid of the cooling system below a predetermined temperature.

A further object of the invention is to provide an electric control means for engine heating systems, said means including an electromagnet, by which a reliable automatic operation can be obtained and a simple structure may be rendered possible.

Another object of the invention is the provision of a burner of suitable construction for heaters, the operation of which is independent of the various oblique positions, the heater may take if mounted in a motor car.

A still further object is the provision of control means for heaters for engine cooling systems, whereby such system may be set for automatic or manual control at will.

Figure 1:
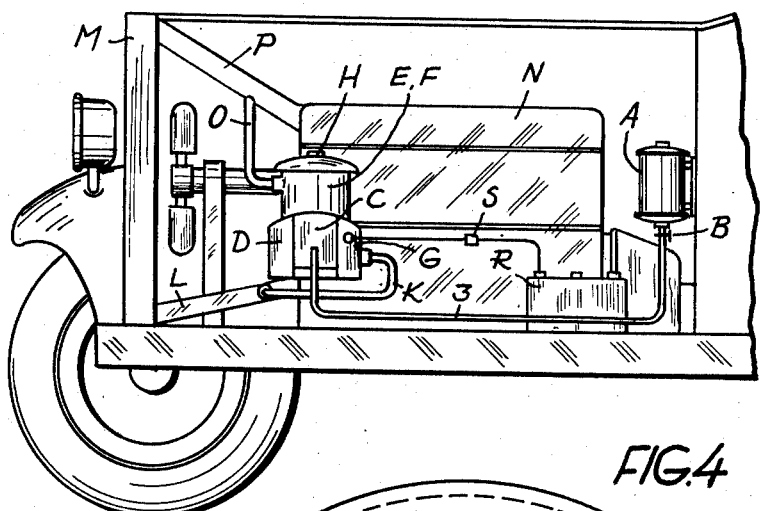

Other objects and advantages of the invention will be apparent from the following detailed description, reference being had to the accompanying drawings, forming part of this specification and in which Fig. 1 is a vertical elevation illustrating the inner of the fore portion of the motor car having an engine heater devised according to the invention and mounted in the cooling system thereof, Fig. 2 is a sectional view illustrating an assembly of the engine heater, the various main devices included therein being shown laterally of one another, Fig. 2a is a vertical elevation illustrating a modification of the burner proper.

Figure 4:
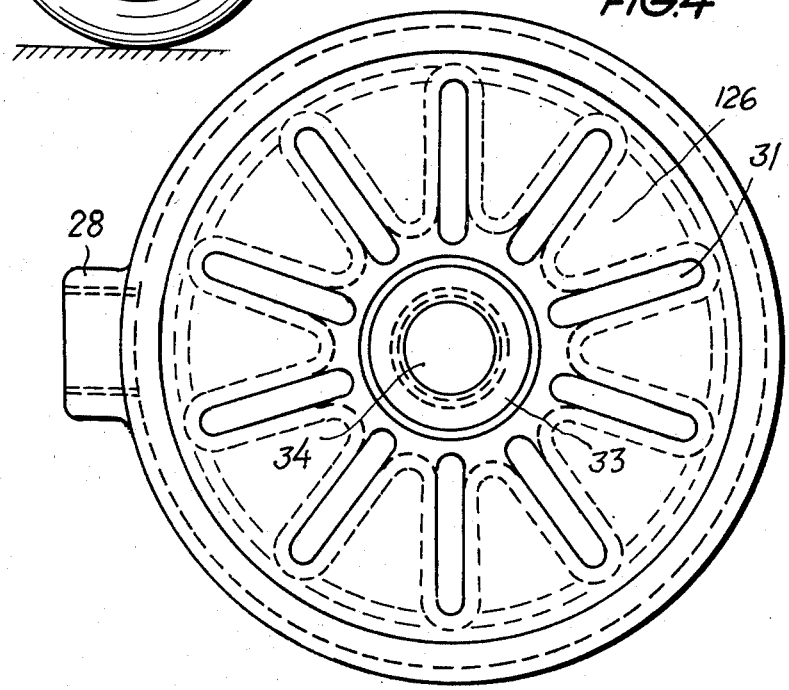
Figure 3:
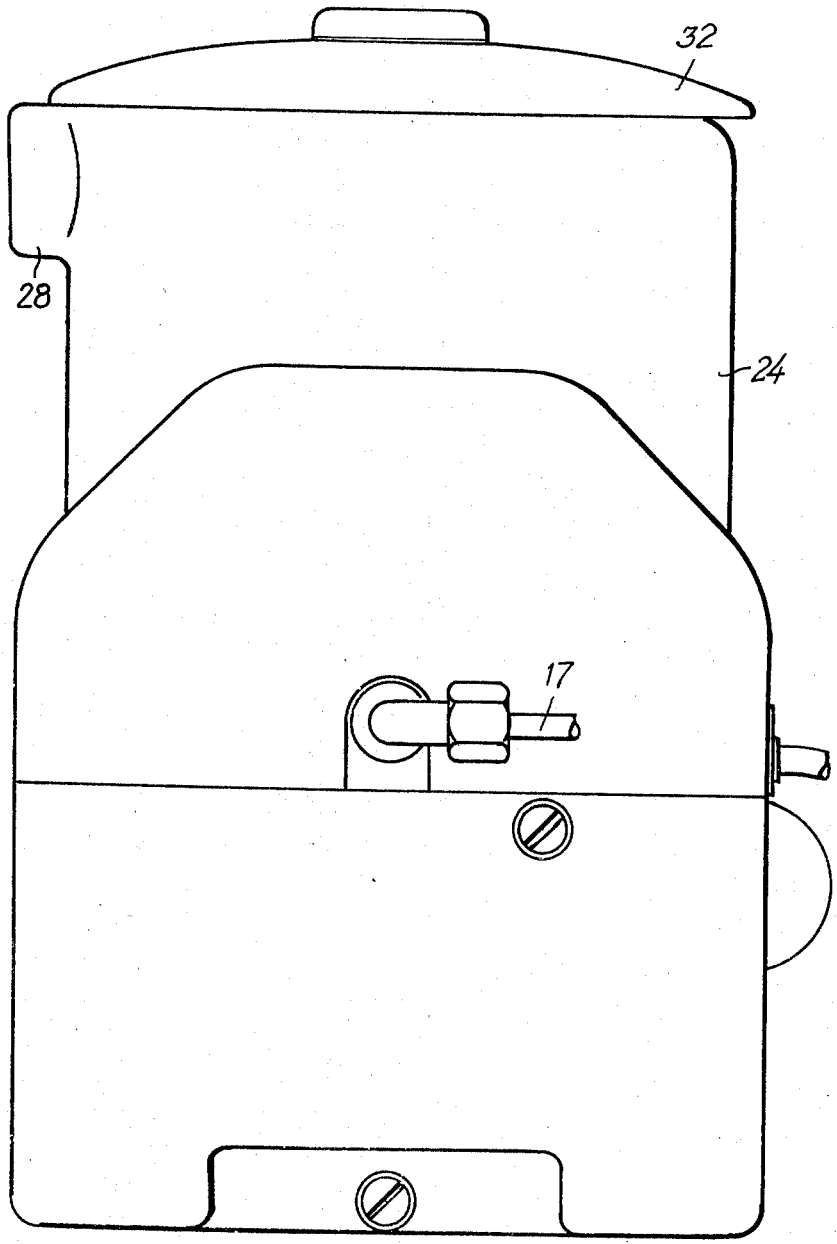

Fig. 3 is a vertical elevation of the burner and the main devices enclosed within the same casing as the burner, Fig. 4 is a top view illustrating the burner included in Fig. 1 with the cover removed, Fig. 5 is a top view of a valve included in Fig. 1 and operated by an electromagnet, the housing thereof being removed, Figs. 6 and 7 are sectional views taken on lines VI—VI and VII—VII respectively in Fig. 2, Figs. 8, 9, 10 and 11 illustrate an electric wiring diagram with associated parts in the various positions taken by the same at certain different temperatures of the cooling liquid.

The cooling liquid heater broadly consists of a container A for liquid fuel, such as spirit, petroleum or the like, said container being formed as a fall tank, a closure means B for manual closure of the fuel supply from said container, a contrivance C to control the level of the fuel, said contrivance comprising a float and a float housing and a fuel valve actuated by said float, an electromagnet D, a burner E, a boiler F comprising a chamber or passage passed by the cooling liquid and adapted to be heated by means of the burner, a thermostat G in the liquid circulating conduit, and a thermostat H responsive to the temperature of the burner flame or the flue gases from the burner.

The contrivance C for controlling the level of the fuel, the electromagnet D and the valve thereof, the burner E with its heat receiving liquid chamber and the thermostat G are assembled to a unit, which as illustrated in Fig. 1, is connected to the conduit L for the cold water between the cooler M and the lower portion of the cooling jacket N of the engine of the vehicle by a pipe K and with the conduit P for the heat water between the top portion of the cooling jacket N and the cooler M by a pipe O. R is the storage battery of the engine and S a manually shiftable switch in an electric lead between the battery R and the thermostat G.

The fuel is conveyed from the tank A through a net strainer 1 to the valve housing 2 of the closure means or check-valve B, and flows from this housing through a conduit 3 into a valve housing 4 at the bottom of the float housing 5. The float 6 in this float housing actuates a nut 7, which is screwed onto a valve rod 8 and adjustable into different positions thereon, said valve rod being provided with a valve body, such as a cone 9 on the lower end thereof projecting into the valve housing 4. In the position shown in Fig. 2, the valve is open, the float 6 then taking its lower position. When the liquid level in the float housing exceeds the position marked by the line 10, the valve cone 9 takes its upper position against the valve seat 11, so that the fuel supply to the float housing is cut off. The float housing 5 is connected through a conduit 12 to a check-valve 14 controlled by the electromagnet D, said valve having a valve seat 16 screwed into the valve housing 15 and adapted to be adjusted into different vertical positions. A conduit 17 extends from housing of the valve 14 to the bottom of the vaporizing member 18 of the burner E, which comprises a passageway, which in the normal operative position of the burner extends vertically or substantially vertically. The passageway has an ascendent portion 203 communicating with the fuel inlet and a descendent portion 204 arranged as a continuation of the portion 203 and opening into a suitably annular distribution chamber 205 for fuel vaporized in the passageway. The distribution chamber has a number of outlet holes 206, which open to the space 207 between suitably conical or cylindrical shells 208, 209 of perforated sheet metal, wire net or the like. In the illustrated embodiment the shells 208, 209 are conical and mounted in coaxial relation to each other, the inner cone enclosing a space 210 which is open downwards to admit combustion air thereinto. At the top there is a cover 211 having an outlet hole 212.

The burner is provided with a preheating and lighting device which comprises an electric heating element in the form of a resistance wire 20 and a surrounding metallic casing 215 in the form of a tube mounted concentrically in the tubular vaporizing member, the wire 20 being connected in series with a glow filament 24. This filament, located in the space 207, is mounted at one end to a grounded terminal 26 secured to the outer surface of shell 209 and is mounted at its other end upon the outer end of a terminal strip 25 which passes through an insulating bushing secured in the wall of shell 209 to the interior thereof. The inner end of terminal strip 25 is connected by wire 76 to the upper end of the heater wire 20. The latter is fixed at its opposite ends in electrical insulating plugs 217, 218 mounted in the tubular casing at the ends thereof, and the passageway 203, 204 is formed by the space between the tubular casing 215 and the tube 18 and a transverse partition 219 (Fig. 6), the top of which is located below the closed top of the tube 18 so as to leave a communication between the portions 203, 204 of the passageway. The glow filament extends into the space 207 at a distance above the gas distribution chamber 205 and the outlet holes 206 thereof. The glow filament, which is adapted to start the burner automatically can readily be exchanged on having been used up.

In operation, when the burner is to be started, the current is switched on to the preheating and lighting device. The passageway 203, 204 is heated by the preheating device. In the vertical portion 203 the fuel extends to a level 10 determined by the level control means. The fuel is vaporized, and the gas passes upward to the top of the passage portion 203 and down through the passage portion 204, in which it is further heated, whereupon the gas escapes through the outlet and enters the distribution chamber 205. In this chamber the gas is distributed to the various outlet holes 206, through which it escapes to enter the space 207. The ascending fuel gas is lighted by the glow filament 24 when passing it. Air flows up inside the inner shell 209 and outside the outer shell 208, and the combustion of the gas takes place in a well-known manner at and between the perforated shells. Heat is transmitted by radiation and conduction from the shells 208, 209 to the casing 13 and the passageway 203, 204, which is located adjacent the inner shell 209. After the burner has been started in this manner, the current is switched off to the heating element and the glow filament, which may occur automatically or manually, as described more in detail hereinafter.

Should the burner take an oblique position so that the passageway 203, 204 does not stand vertically, the level of fuel in the passage portion 203 will rise or sink, which, however, have no influence upon the operation of the burner, when the level is located above the bottom of the passage portion 203 and below the top thereof.

The liquid chamber for the heating fluid which communicates with the cooling system of the engine is illustrated in the drawing with an inlet 27 and an outlet 28. Located therebetween are a pocket 29 and the liquid chamber F surrounding the burner E. The pocket and said chamber being interconnected by a tube piece 23. The liquid chamber is confined by a suitably cylindric outer jacket 124 and an inner wall 125, the top of the latter being provided with radial projections 126 filled up with liquid to increase the heat receiving surface. Formed between the top of said projections are outlet slots 31 (Fig. 4), from which the flue gases from the burner are deflected laterally under a cover 32, screwed onto a screw-threaded collar 33. Located below said collar is the flue gas thermostat H in a pocket 34, which is closed at the top thereof by an electric insulating plug 35.

The electromagnet D comprises a casing 36 having a bottom opening 37 and a cover 38. Provided in this casing is an upper electromagnet winding or coil 39 and a lower electromagnet winding or coil 40, and in central recesses in said windings there is arranged an amature 42 devised to move up and down in said recesses the electromagnet coils, said armature being associated with a shaft 43 extending freely through central apertures in the coils. Pole shoes 41, 41' surround the coils 39 and 40 respectively in part and form abutments for the armature. The shaft 43 carries, on the lower end thereof, a valve member 44 adapted to cooperate with the valve seat 16 of the valve 14, in order thus to cut off the fuel supply to the burner E. The valve housing 15 is separated from the interior of the electromagnet casing 36 through a diaphragm 45, which is clamped with a tight fit to the shaft and to the border of the opening 37. Outside the casing 36 the shaft 43 carries, on the upper end thereof, a threaded rod 46 having an adjustable disk nut 47 from electrical insulating material arranged thereon. The rod 46 carries on the top thereof an electrically insulated button 48. Secured to the top of the cover 38 are three pairs of contacts 49, 49', 50, 50' and 51, 51' formed as leaf springs. The first-mentioned two pairs of contacts are so devised as to be kept apart when not acted upon, whereas the last-mentioned pair of contacts 51, 51' are so devised as to engage each other when not acted upon. The disk nut 47 on the rod 46 is adapted to cooperate with the pairs of contacts 49, 49' and 50, 50' to bring these contacts into engagement with each other, while the button 48 on the rod 46 is intended to cooperate simultaneously with the contact 51 and to bring the latter out of engagement with the contact 51'. Associated with the electromagnet is a spring mechanism consisting broadly of a spring leaf 52 having the shaft 43 extending therethrough, to which it is secured at the central portion thereof, while being also secured with the peripheral portion thereof to the casing 36. This spring mechanism is intended to retain the armature 42 in an upper or a lower position on having been moved to these positions by a current impulse through the coils 39 or 40, respectively.

The thermostat arranged in the pocket 29 is provided with two contact springs 54, 55 insulated from each other and with a bimetallic spring 56 adapted to close a current circuit over the one spring 54, when the temperature of the water is low, such as 10° C., and over the other contact spring 55 at a higher temperature, such as 60° C. For the sake of simplicity, the contact spring 54 is here called the "cold" contact, whereas the contact spring 55 is called the "warm" contact. The springs 54, 55, 56 are thrust down into a tube 57, which is washed by the liquid flowing forth in the pocket 29. The tube 57 is secured with a tight fit in a cover 58 closing the pocket 29 at the top, and the springs 54, 55, 56 are separated by insulating pieces 60 and kept together with the latter as a unit by means of screws 59, said unit being insulatingly secured in a cover 61, which closes the upper mouth of the tube 57.

The thermostat H comprises a bimetallic spring 62 having contacts 103, 104 and, at each side of the same, a contact member 63 and 102. Connections to this contact spring and these contact members are designated with 65, 66 and 105, respectively. In the cold state the contact 103 of the bimetallic spring 62 touches the contact 63 to close the current circuit at this place, but when the bimetallic spring is warm, it is deflected to the left in Fig. 2 and interrupts the current at contact 102 but closes the circuit at 63 by its contact 104.

The elecrical connections between the electromagnet and the thermostat are shown in the wiring diagram according to Figs. 8–11. Extending from the positive terminal of a source of current 72, preferably the battery of the engine (R in Fig. 1), is a wire 73 to the contact 49 of the electromagnet, said wire preferably extending over a manually operable switch 73′ (S in Fig. 1), by means of which the source of current may be thrown into and out of circuit. Extending from the corresponding contact 49′ to the bimetallic spring 62 of the thermostat H is a wire 74, and from the contact 63 of this thermostat a wire 75 extends to the preheating winding 20, which is connected to one terminal 25 of the ignition filament 24 through a wire 76. The other terminal 26 of the ignition filament is connected to earth. Thus the preheating wire 20 and the ignition filament 24 are connected in series, and the throwing of the same in and out of circuit is dependent on the pair of contacts 49, 49′ of the thermostat H as well as of the electromagnet D.

From the wire 73 extending from the positive terminal of the source of current 72 a wire 77 is extended to the bimetal spring 56 of the thermostat G. The "cold" contact of this thermostat is connected through a wire 78 with the contact 51 of the elecromagnet, while the corresponding contact 51′ is connected through a wire 79 with one end of the electromagnet winding 39. The other end of this winding is connected to earth. The "warm" contact 55 of the thermostat G is connected through a wire 80 with the contact 50′ of the electromagnet, while the corresponding contact 50 is connected through a wire 81 with the electromagnet winding 40. The other end of this winding is connected to earth. The negative terminal of the source of current 72 is connected to earth through a wire 82.

The "cold" contact 54 of the thermostat G is shunted through a wire 83 comprising a manually operable switch 84, such as a push button switch, by means of which the apparatus may be started manually, independently of the thermostat G. If desired, the switch 84 may be substituted for the contact 54. In a similar manner, the "warm" contact 55 is shunted through a wire 85 comprising a switch 86, by means of which the heating apparatus may be disconnected manually.

The thermostat H may be modified in many respects, particularly so as to be actuated directly by the heat of radiation from the flame of the burner intsead of by the flue gas heat.

According to the modified construction illustrated in Fig. 2a, the burner housing 87 is provided with a central passage 88 for combustion air. At the top, the burner housing forms an annular space 89 for the wick 90. The outer wall of the space 89 has its upper portion 91 perforated. The lower portion 92 is surrounded by the preheating coil 93, and immediately beside the upper portion 91, the ignition filament or filaments 94 are extended between projections or flanges 95, 96. The burner flame, which is formed at the burning of combustion gases escaping through the perforated wall 91, is enclosed between an internal perforated pipe 97 and an outer perforated jacket 98. The pipe 97 forms an upward continuation of the passage 88, and the jacket 98 surrounds the upper portion of the burner housing together with the preheating coil and the ignition filaments. The air for the combustion proceeds upwardly both within the pipe 97 and outside the jacket 98. A socket 99 is adapted to be connected to the fuel supply pipe 17 (Fig. 2). The pipe coil 30 for the cooling liquid is connected at the top to a receptacle 100 forming a roof above the pipe 97 and the upper borders of the jacket 98. Provided in the intermediate space between the receptacle 100 and the upper borders thereof is a heat conducting plate 101 consisting, for instance, of copper, said plate conducting heat from the burner flame to the thermostat H. Apart from the plate 101 the thermostat may be principally of the same construction as that illustrated in Fig. 2 and thus it may have a bimetallic spring 62 with contacts 103, 104 between two stationary contacts 62, 102, which are electrically insulated from each other and from the bimetallic spring. The plate 101 has direct heat conducting connection with the bimetallic spring, so that heat will be readily conducted to the latter. 65 designates a current connection for the contacts 103, 104 of the bimetal spring, and 66 denotes a current connection for the fixed contact 63, while 105 designates a current connection for the fixed contact 102. The contacts 103, 63 touch one another when the thermostat is cold, while the contacts 102, 104 touch each other, when it is warm, that is to say when the burner is ignited. In the latter case, a circuit is closed over an indicating means, such as a signal lamp 106 in an earthed wire 107 connected to the connection 105, Fig. 10.

108, 109 designate safety fuses connected into the leads 77 and 74 respectively (Fig. 8). These safety fuses may be arranged on a switch board together with the swiches 73′, 84 and 86 and the signal lamp 106.

The function of the heating apparatus described is broadly as follows. When the temperature of the cooling system of the motor is at a value between the temperature limits, for instance 10° C. and 60° C., at which the contact spring 56 of the thermostat G cooperates with the contacts 54 and 55, respectively, the thermostats G and H and the movable parts of the electromagnet D take the positions shown by way of example in Fig. 8. Thus the contact spring 56 of the thermostat G is out of engagement with the contacts 54 and 55, while the contacts 62, 63 of the thermostat H are thrown into circuit and the armature 42 of the electromagnet takes its lower position, so that the valve 14 is closed. Consequently, fuel cannot flow from the receptacle A to the burner E. The disk nut 47 arranged on the shaft of the armature and the button 48 are out of engagement with the contacts of the electromagnet, the pairs of contacts 49, 49' and 50, 50' being thus open, while the pairs of contacts 51 and 51' are closed.

Now, if the temperature of the radiator liquid falls to a lower limit, for instance to 10°, or below, the current is closed over the contacts 54, 56 of the thermostat G, so that a current impulse is obtained from the positive terminal of the source of current over the wire 77, said contacts 54, 56, the wire 78, the closed contacts 51, 51', the wire 79, and the upper winding 39 of the electromagnet. The armature 42 will thus be pulled upwards while overcoming the resiliency of the spring mechanism 52, which at a given moment brings about a momentary upward movement of the shaft 43. Thus, the pair of contacts 51, 51' will be momentarily opened, while the pairs of contacts 49, 49' and 50, 50' are closed at the same time. The circuit over the electromagnet winding 39 is thus interrupted immediately, while another circuit is closed from the positive terminal of the battery over the lead 73, the pair of contacts 49, 49' the lead 74, the thermostat H already closed, the lead 75, the preheating winding 20, the lead 76, and the ignition filament 24 to earth. This condition is shown in Fig. 9. The preheating winding 20 now heats the evaporizing tube 18, to which the fuel supply is opened at the upward movement of the armature 42 and thus of the valve member 44. The fuel commences to gasify, and the burner is ignited and operates in the manner described hereinbefore. The liquid flowing in the circulation passage F will thus be heated, so that the cooling system of the engine and the engine proper are heated.

As soon as the burner has been lighted, the thermostat H is heated, so that the current is interrupted at the contacts 62, 63, and is closed at the contacts 102, 104. The signal lamp 106 in the lead 107 is illuminated so as to indicate that the burner is lighted.

The temperature of the thermostat pocket 29 having the cooling liquid flowing therethrough also rises, so that the contact 56 of the thermostat G is brought out of contact with the cold contact 54, as shown in Fig. 10. The heating of the thermostate H and the opening of the contacts 62, 63 involves that the circuit for the preheating winding 20 and the ignition filament 24 is interrupted. The armature 42 remains in its upper position, however, wherein it is held by the spring mechanism 52.

As soon as the upper temperature limit has been reached in the cooling liquid system, the contacts 56, 55 of the thermostat G are closed, as shown in Figs. 10 and 11. A current impulse is thus obtained from the positive terminal of the source of current over the wire 77, said contacts 56, 55 the lead 80, the pair of contacts 50', 50 (Fig. 10), the lead 81, and the lower electromagnet winding 40 to earth. The armature 42 is thus pulled downwardly, and the spring mechanism 52 aids toward effecting a momentary removal of the disk nut 47 and the button 48 from the contact springs 49', 50' and 51. At the downward movement of the armature the valve member 44 is moved against its seat 16, so that the valve 14 is closed and the fuel supply to the burner E is interrupted. The burner thus becomes extinguished, as soon as the fuel in the conduit 17 behind the valve 14 and in the burner housing 18 has been completely burnt. When the burner has become extinguished, the thermostate H is cooled down, so that the current to the signal lamp 106 is interrupted by the contacts 102, 104, and is then closed over the contacts 103, 63. The same condition, which is shown in Fig. 8, has now been reached, and a further heating period may commence, should the temperature of the cooling liquid fall below the lower limit value.

If it is desired to start the burner, when the thermostat G is interrupted (Fig. 8), this may be effected by the closing of the switch 84. When this is done, the current flows from the positive terminal of the source of current over the wires 73, 77, the wire 83 with the switch 84, the wire 78, the contacts 51, 51', the wire 79 and the electromagnet winding 39 to earth, the electromagnet being thus caused to open the fuel valve, so that the burner is lighted in the manner hereinbefore described. Analogously, the burner may be extinguished by disconnecting the switch 86, which has the same effect as if the current were interrupted at the contacts 55, 56 of the thermostat G.

The mode of operation of an apparatus with the modified construction of the burner is analogous to the mode of operation described. It should be noted that, although the apparatus in Fig. 2 has been shown with a thermostat H with contacts for the signal lamp, these contacts may be omitted, if a signal lamp is not deemed desirable.

Alterations of the details shown may also be undertaken in many other respects within the scope of the invention. The invention may be used in heating apparatus for other purposes than cooling systems for engines, such as for heating of rooms in houses, the thermostat G being placed in the room to be heated and the communication means 27, 28 being connected with the pipe system of the heating plant.

What I claim is:

1. In a heater for maintaining the temperature of the cooling liquid of an engine cooling system at controlled values, the combination of a liquid chamber, liquid connections between said chamber and the engine cooling system, thermostatic means responsive to the temperature of the cooling liquid, an electromagnet having a movable armature and being controlled by said thermostatic means, a liquid fuel burner for heating the liquid chamber, a fuel tank disposed above the level of said burner, a conduit interconnecting said tank and burner to supply liquid fuel to said burner by gravity flow, a float operated valve in said conduit for maintaining a constant fuel level in said burner, a valve controlling said fuel supply, said valve in said conduit between said float operated valve and burner being connected with the armature of the electromagnet, a circuit comprising said thermostatic means and contacts, and means connected with said armature to operate said contacts and to automatically open the fuel valve at movement of the armature in one direction and closing the valve and operate the contacts at movement in the other direction.

2. A control means for maintaining the temperature of the cooling liquid of an engine cooling system between a low limit and a high limit of temperature, the combination of a liquid passage, liquid connections between said passage and said engine cooling system, a burner to heat said passage, an electromagnet having two windings and a movable armature, a valve for the control of the fuel supply to the burner, said valve being connected with the armature, a thermostat responsive to the cooling liquid temperature and having a contact engaged at the low temperature limit and a contact engaged at the high temperature limit, a member responsive to the temperature of the burner, three contacts operated by the movable armature, and a first circuit comprising the thermostat contact for the low limit of temperature and one electromagnet winding, a second circuit comprising the thermostat contact operated at the high limit of temperature and the second electromagnet winding, and a third circuit comprising the member responsive to the burner temperature.

3. Control means as claimed in claim 2 and further comprising a spring mechanism adapted to maintain said armature in the position, into which it has been set at energizing either electromagnet winding.

4. In a heater for maintaining the temperature of the cooling liquid of an engine cooling system at controlled values, the combination of a liquid passage, communication means between said passage and the cooling system, a liquid fuel burner for heating the liquid in said passage, a fall tank for the fuel, means connecting the fall tank with the burner, a float operated valve in said connecting means for maintaining a constant fuel level in the burner and an electromagnetic liquid valve for controlling the flow of fuel through said connecting means.

5. A control means as claimed in claim 2, in which the third circuit comprises a lighting and pre-heating device in series with the thermostat responsive to the burner temperature.

6. In a control means as claimed in claim 2, a manually operable switch coupled parallel with the contact of the thermostatic means operating at the low limit of the cooling liquid temperature and coupled in series with the electromagnet.

7. In a control means as claimed in claim 2, a manually operable switch is coupled to shunt the contact of the cooling liquid responsive thermostat operating at the high limit of the cooling liquid temperature to enable manual disconnection of the control means.

8. A control means as claimed in claim 2, in which the member responsive to the temperature of the burner comprises a thermostat having a contact, indicating means being coupled to said contact to be engaged in dependence thereon during the period of operation of the burner.

9. In a heater for maintaining the temperature of the cooling liquid of an engine cooling system at suitable values, the combination of a liquid chamber, liquid connections between said chamber and the engine cooling system, a liquid fuel burner for heating said liquid chamber, said burner comprising an evaporation passage for the fuel extending substantially vertically in the normal operative position of the heater, a pre-heating element mounted in said passage, said pre-heating element being disposed within a tubular member and said passage being formed by the space between said pre-heating element and the wall of said tubular member, a fuel tank disposed above the level of said burner, communication means between the fuel tank and said evaporation passage for conducting fuel by gravity to said passage, a float operated valve to maintain the fuel at a predetermined level in the evaporation passage, and an electromagnetic liquid valve for interrupting the fuel supply to the burner at a high limit of temperature of the cooling liquid and for opening said fuel supply at a low limit of temperature of the cooling liquid.

10. In a heater for maintaining the temperature of the cooling liquid of an engine cooling system between predetermined limits, the combination of a liquid chamber, liquid connections between said chamber and the engine cooling system, a liquid fuel burner for heating said liquid chamber, said burner comprising an evaporation passage having an inlet portion extending upward and a vaporizing portion extending downward from a communication with the upward portion, the burner further comprising a distribution chamber receiving the vaporized fuel from the downward extending passage portion and a combustion chamber formed by the space between perforated metallic shells, an automatic lighting device in said space above the distribution chamber, a fuel tank, communication means between said fuel tank and said upward portion of the evaporation passage for conducting fuel thereto, a float operated valve to maintain the fuel at a predetermined level in the upward portion of the evaporation passage, an elevator magnet having a movable armature, a valve in the fuel communication means between the fuel tank and the burner, said valve being connected with the armature to be actuated thereby to open the fuel communication at a low limit of temperature in the cooling liquid and to close the valve at a high limit of temperature.

11. A heater as claimed in claim 10, in which the evaporation passage is located in heat transmitting proximity of the gas distribution chamber.

12. A heater as claimed in claim 10, in which the evaporation passage is located in heat transmitting connection with the space between the perforated shells.

13. Control means for heaters of liquid, comprising an electromagnet having an armature movable between two extreme positions, a winding for the movement of the armature in one direction and a winding for the movement thereof in the opposite direction and further having three pairs of contacts, two of said pairs being engaged in one of said positions and disengaged in the other position and the third pair being disengaged in the first position and engaged in the second position, means connecting said latter pair with one of the windings and means to connect one of the remaining pairs with the other winding, a liquid fuel valve connected with the armature, a burner, means for igniting said burner, said means comprising a thermostat responsive to the temperature of the burner and connected with the other of the remaining pairs of contacts, and means responsive to the temperature of the liquid heated by the burner, the last-mentioned means being connected with the windings of the electromagnet to energize one winding at a certain temperature of the liquid for opening the valve, and the other winding for closing the valve at a higher temperature.

14. In a heater for maintaining the temperature of the cooling liquid of an engine cooling system at controlled values, the combination of a liquid passage, communication means between said passage and the cooling system, a fuel burner in heat transfer relation with the liquid in said passage, a fuel tank, a fuel line connecting said tank with said burner, an electrically heated ignition device for the fuel admitted to said burner, an electrically actuated valve in said fuel line controlling fuel flow to said burner, a thermostat responsive to the temperature of the cooling liquid and controlling energization of said fuel control valve, and a second thermostat responsive to the temperature of said fuel burner controlling energization of said ignition device, said second thermostat and ignition device being connected in an energizing circuit including switch means actuated by said fuel control valve.

GUY JOHN OLOF WELIN-BERGER.

REFERENCES CITED

The following references are of record in the file of this patent:

UNITED STATES PATENTS

| Number | Name | Date |
|---|---|---|
| 1,529,906 | Morris | Mar. 17, 1925 |
| 1,857,767 | Rentz | May 10, 1932 |
| 2,046,812 | Danuser et al. | July 7, 1936 |
| 2,074,168 | Danuser et al. | Mar. 16, 1937 |
| 2,159,257 | Danuser et al. | May 23, 1939 |
| 2,247,858 | Selby | July 1, 1941 |
| 2,257,755 | Morici et al. | Oct. 7, 1941 |
| 2,257,756 | Morici et al. | Oct. 7, 1941 |

FOREIGN PATENTS

| Number | Country | Date |
|---|---|---|
| 545,957 | Great Britain | June 19, 1942 |